N. BOLERATZ.
CULINARY BOILER.
APPLICATION FILED MAR. 15, 1916.

1,214,992.

Patented Feb. 6, 1917.

Inventor
N. Boleratz

By N. M. Wilson
Attorney

UNITED STATES PATENT OFFICE.

NORINE BOLERATZ, OF DETROIT, MICHIGAN.

CULINARY BOILER.

1,214,992.  Specification of Letters Patent.  Patented Feb. 6, 1917.

Application filed March 15, 1916. Serial No. 84,388.

*To all whom it may concern:*

Be it known that I, NORINE BOLERATZ, a citizen of the United States of America, residing at Detroit, in the county of Wayne and State of Michigan, have invented certain new and useful Improvements in Culinary Boilers, of which the following is a specification.

This invention relates to new and useful improvements in culinary boilers.

The primary object of the invention is the provision of a kitchen utensil in the nature of a boiler especially adapted for cooking vegetables, such as potatoes, the device being cheap and easy to manufacture and employing but few parts which are separable thereby rendering the same more sanitary.

A further object of the invention is the provision of a two part boiler having an adjustable connecting ring, whereby the said parts may be positioned at different relative telescoping positions, the said parts and ring being readily separated when desired.

A still further object of the invention is the provision of a fluid receptacle and an article container arranged one within the other and capable of relative adjustment whereby the container may be readily drained or entirely removed from the fluid receptacle.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views:—

Figure 1:
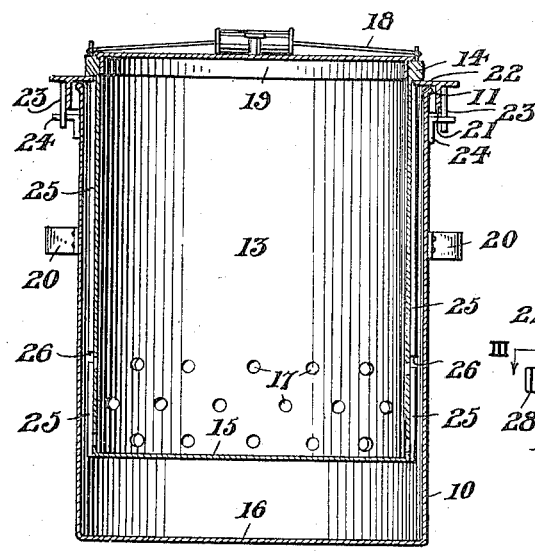
Figure 1 is a central longitudinal sectional view of the device with the elements as normally positioned for cooking purposes.

It will be understood that the culinary article now designed is serviceable for cooking various kinds of vegetables by boiling the same, although it is especially designed for cooking potatoes. The device broadly consists in a fluid receptacle or boiling member 10 provided with an annular bead 11 around the open top thereof and upon which an annular connecting ring 12 of T-shaped form in cross section is shiftably positioned for supporting an article container 13 of less dimensions than the receptacle 10.

The said container 13 has an annular top rim 14 adapted to normally rest upon the ring 12 with the container arranged within the receptacle during the boiling operation, as best illustrated in Fig. 1 of the drawings, at which times the bottom 15 of the container is arranged in spaced relations above the bottom 16 of the receptacle, it being noted that a boiling fluid is placed within the receptacle 10 to the desired height while the container has a plurality of perforations 17 through the sides thereof for admitting water and steam to the articles within the container thereby cooking such articles.

A lifting bail 18 is hinged to the container rim 14 while a removable cover 19 for the container is also normally arranged seated upon the rim 14, while opposite handles 20 are carried by the receptacle 10.

The aforementioned connecting ring 12 being T-shaped in cross section as herein noted has its upright or shorter flange 21 overlying the top edge of the receptacle 10 at the bead 11, the main or cross flange 22 resting upon the said bead and capable of being rotarily shifted thereon, it being noted that depending hooks 23 carried by the ring flange 21 are normally arranged in locking engagement with laterally projecting lugs 24 of the receptacle 10.

Reinforcing strips 25 are oppositely arranged upon the container 13 outwardly thereof, the said strips having interruptions or slots 26 arranged therein upon a level substantially with the upper ones of said container perforations 17. The ring 12 is provided with notches 27 at the inner edge of the flange 22, the said notches being of a sufficient size to allow the strips 25 to slide therethrough during the raising and lowering of the container 13 with respect to the receptacle 10, the said strips being normally positioned within the said notches during the boiling operation.

Figure 2:
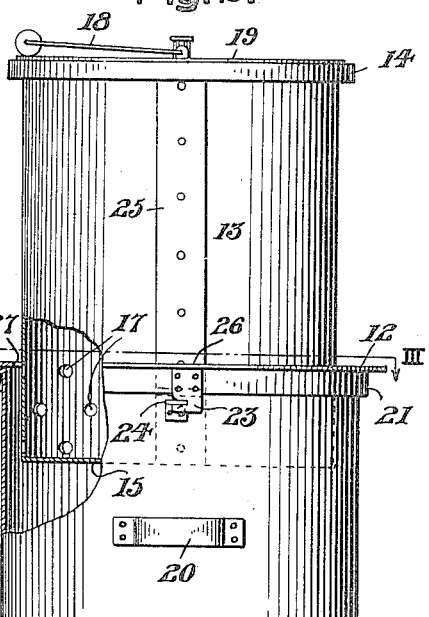
Fig. 2 is a side elevation thereof with the elements arranged for draining the article container.
Figure 4:
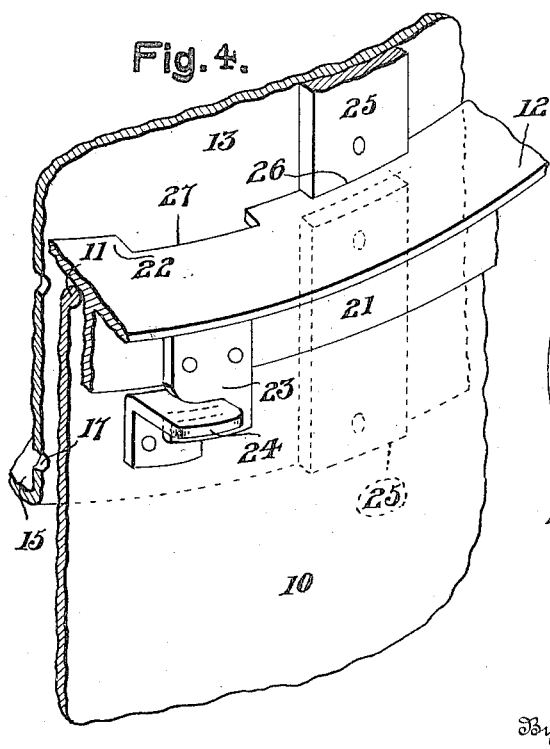
Fig. 4 is an enlarged perspective view of a portion of the device as illustrated in Fig. 2, showing the ring connecting means between the container and receptacle.
Figure 3:
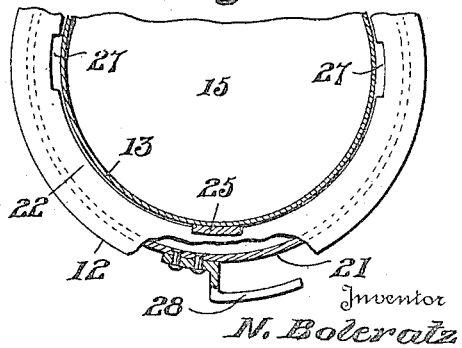
Fig. 3 is a partial transverse sectional view taken upon line III—III of Fig. 2.

The boiling of the vegetables within the container 13 is accomplished when the elements are arranged as shown in Fig. 1 of the drawings and when it is desired to drain the container 13, the latter is elevated by means of its bail 18 until the slots 26 are in alinement with the flange 22, at which time the container 13 is slightly rotated, thus seating the inner edge or periphery of the ring flange 22 within the slots 26 and positioning the container for draining purposes, as best illustrated in Fig. 2 of the drawings.

It will be noted that during the draining operation, the container 13 may be elevated and by reason of its connection with the ring 12 and the connection of the ring with the receptacle 10 by means of the hooks 23 and lugs 24, the entire device may be shifted as desired by means of the handle 18, while the receptacle handles 20 are employed for moving the device when the container is in its lowered normal position. A hand-hold arm 28 is carried by the ring 12 to be readily grasped when desired to shift the said ring for disengaging the ring from the receptacle 10, at which times the ring and container 13 may be bodily moved together while the ring may be readily separated from the container when desired.

A serviceable vegetable boiler is thus arranged readily operable for cooking and draining vegetables, the parts of which are readily separable for cleaning.

While the form of the invention herein shown and described is what is believed to be the preferable embodiment thereof, it is nevertheless to be understood that minor changes may be made in the form, proportion and details of construction without departing from the spirit and scope of the invention as hereinafter claimed.

What I claim as new is:—

A culinary boiler comprising a receptacle having laterally extending flat lugs secured thereto upon opposite sides and near the top thereof, a ring member of T-shape in cross-section adapted to rest upon the upper edge of said receptacle, the vertical flange of said ring member being adapted to embrace the outer upper portion of said receptacle and the horizontal portion thereof having a smaller internal diameter than said receptacle and provided with opposite notches in the inner edge thereof, opposite depending flat hooks secured to the outer face of said vertical flange and adapted for engagement with said laterally extending lugs, a second receptacle adapted to be placed within said first mentioned receptacle having an external diameter substantially equal to the internal diameter of the horizontal portion of said ring member and having a bead around the top edge thereof adapted to rest upon said horizontal portion of said ring member and support the second receptacle within the first mentioned receptacle with the bottoms of said receptacles in spaced relation, said second receptacle being provided with perforations in the sides and near the bottom thereof, opposite vertical flat strips secured to said second receptacle and provided with horizontal interruptions at points even with the uppermost of said perforations, said strips being of a form and size in cross-section similar to the form and size of said notches and the unnotched portions of said horizontal portion of said ring member being adapted to engage in said interruptions or slots of said strips to hold said second receptacle in elevated position with the perforated portion of said second receptacle below the top edge of said first mentioned receptacle.

In testimony whereof I affix my signature.

NORINE BOLERATZ.

Copies of this patent may be obtained for five cents each, by addressing the "Commissioner of Patents, Washington, D. C."